Figure 1:
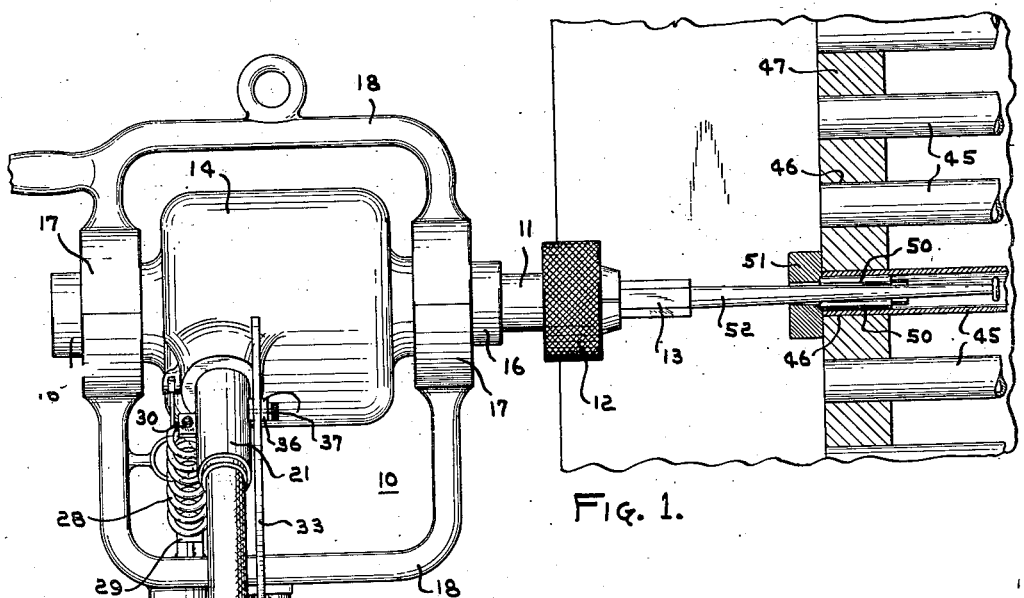

Nov. 13, 1945.  P. J. WELCH  2,389,098
METHOD OF EXPANDING TUBES IN TUBE SEATS
Filed April 21, 1942

WITNESSES:

INVENTOR
PHILIP J. WELCH.
BY
ATTORNEY

Patented Nov. 13, 1945

2,389,098

UNITED STATES PATENT OFFICE 2,389,098

METHOD OF EXPANDING TUBES IN TUBE SEATS

Philip J. Welch, Brookline, Pa., assignor to Westinghouse Electric Corporation, East Pittsburgh, Pa., a corporation of Pennsylvania Application April 21, 1942, Serial No. 439,946

1 Claim. (Cl. 153—82)

An object of the invention is the provision of improved roller tube-expanding method, whereby a plurality of tubes may be expanded with the same degree of tightness, regardless of variations in tube and tube seat tolerances.

In using the conventional roller tube expander driven by an air turbine or the like, the operator regulates the amount that the tube is rolled either by the sound, due to the slowing of the air turbine, or by the torque sensation of the air machine felt in the hands. These methods depend upon the operator's sense of hearing or feeling and result in some tubes being underrolled while others may be overrolled. Obviously, underrolling may result in leakage, while overrolling may produce undesirable stresses in the tubes.

Attempts have been made to overcome non-uniform tube rolling by placing limiting devices on the tube-expanding element so that the operator can expand only to a certain predetermined internal diameter of the tube. This method still does not result in uniformly rolled tubes since variations occur because of size tolerances of the tubes and the holes and on account of the wear of the tube expander.

It is known that torque is a measure of amount of rolling, that is, the machine driving the tube expander exerts a given torque for a given amount of rolling. By "amount of rolling" it is meant the amount that the original cross-sectional area is reduced by rolling.

The present invention provides a method for limiting the amount of rolling by measuring and controlling the torque. This is accomplished by supporting the conventional air machine in roller or other frictionless bearings which are carried by a tool or frame by which the machine is held or guided during the rolling operation. Resilient means are provided between the frame and the air machine, extension of this resilient means during operation of the device being a measure of the torque produced by the rolling. Suitable indicating means is attached to the frame to indicate the relative amount of movement of the air machine with respect to the frame and hence the relative amount of torque exerted by the roller-expanding element.

By making tests to determine the optimum amount of torque for given combinations of tube and tube plate sizes and materials, it is possible to mark a point on the indicator beyond which the air machine should not be allowed to pass in its movement relative to the frame. Thus when, during a rolling operation, the air machine reaches the marked point on the indicator, the operator knows that the tube is suitably rolled.

Therefore, yet another object of the invention is to provide an improved method of expanding tubes into tube seats.

Figure 2:
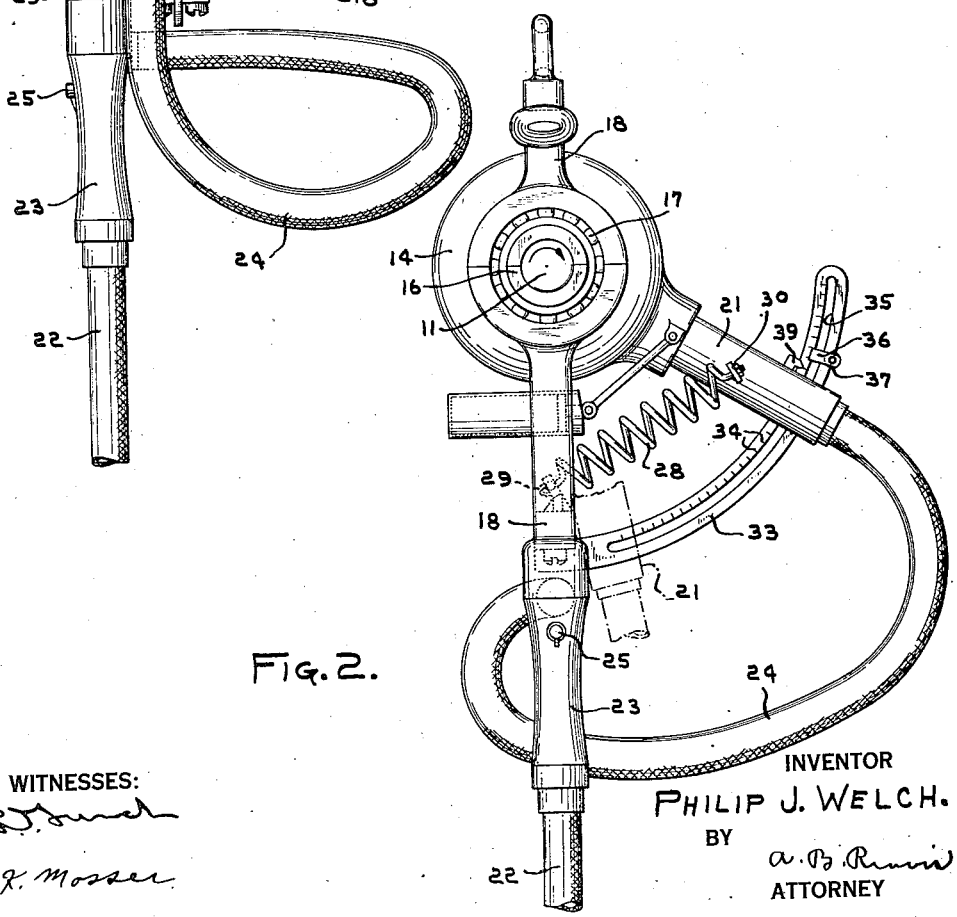

These and other objects are effected by the invention as will be apparent from the following description and claim taken in accordance with the accompanying drawing, forming a part of this application, in which:

Fig. 1 is a side elevational view partially in section, showing the invention as applied to a roller tube-expanding device; and, Fig. 2 is an end elevational view looking at the left-hand end of the apparatus shown in Fig. 1, with the work being operated upon omitted.

Referring now to the drawing more in detail, there is shown, at 10, a rotary tool driving device comprising a rotor 11 having at one end a chuck 12 adapted to hold a rotary tool 13. The rotor is enclosed in and supported by a casing 14 having journals 16 mounted in frictionless bearings 17 of a frame 18 to permit limited rotation of the casing with respect to the frame.

Suitable motive fluid, such as air, for causing rotation of the rotor 11, is conducted to the casing and rotor by an inlet connection 21 on the former, which is connected to a main supply conduit 22 by a hollow handle portion 23 carried by the frame 18, and a flexible connecting conduit 24 between the handle 23 and the inlet connection 21. In order to permit easy control of admission of motive fluid to the casing, there is provided in the handle 23 a trigger mechanism 25 operatively connected to a valve controlling the motive fluid passage.

To limit the amount of rotation of the casing 14 relative to the frame 18, a coiled tension spring 28 is secured at 29 to the frame and at 30 to the inlet connection of the casing. It will be apparent that the spring 28 will not only exert a force resisting relative rotation between the frame and the casing but that this force will increase in amount as the amount of relative rotation increases.

To measure the amount of this relative rotation between the casing and the frame, there is provided suitable means, such as the arcuate indicator arm 33 provided with a plurality of graduations 34. Preferably, the indicator arm 33 is slotted, as at 35, to provide for reception of the gauge 36, which may be slid along the indicator arm and retained at any desired point thereon by tightening the set screw 37.

Fig. 1 is illustrative of operation of the improved device. It is used for expanding the tubes 45 into the seats 46 provided therefor in the tube plate 47. The tube-expanding tool 13 is of conventional structure and it includes a plurality of rollers 50 carried by a ring 51 and mounted upon an expanding mandrel 52.

When motive fluid is supplied to the casing 14 of the machine 10, as a result of the operator pressing the trigger or finger control 25, the tool 13 and mandrel 52 which is rigid therewith, will rotate in a clockwise direction as indicated by the arrow in Fig. 2. As the operator pushes inwardly upon the mandrel, the rollers 50 will be spread apart, thereby expanding the terminal portion of the tube 45 into tight engagement with its seat 46 in the tube plate 47. While the tube is expanding, there will be little or no torque applied through the mandrel 52 and rotor 11 tending to cause counterclockwise rotation of the casing 14, and such rotation as there may tend to be will be opposed by the force exerted by the coil tension spring 28. As the tube becomes firmly expanded against its seat, the torque transmitted through the mandrel 52 and rotor 11 will increase, resulting in increased counterclockwise rotation of the casing 14 with respect to the frame 18. When this counterclockwise rotation has increased to such an extent that the pointer 39 mounted on the inlet connection 21 of the casing is aligned with the stop 36 on the indicator 33, the operator will know that the tube is properly expanded.

Before starting the rolling operation, the stop 36 should be set to a position on the indicator 33 which, by previous experimentation, has been found to correspond to the position of the pointer 39 when the optimum torque for rolling under the conditions then encountered is present; that is, the optimum torque necessary for suitable rolling of the particular sizes and materials of tube and tube plate.

While, for the sake of illustration, the device is herein shown and described in connection with the rolling of tube into tube plates, it will be apparent to those skilled in the art that the principles of the invention may be applicable in other operations and with various types of tools.

While the invention has been shown in one form, it will be obvious to those skilled in the art that it is not so limited, but is susceptible of various changes and modifications without departing from the spirit thereof, and it is desired, therefore, that only such limitations shall be placed thereupon as are specifically set forth in the appended claim.

What is claimed is:

In the expanding of terminal portions of tubes in tube seats provided in supporting wall structure, the process of obtaining uniform predetermined optimum sealing engagement of the tubes with their seats regardless of variations in tube and tube seat dimensions resulting from manufacturing tolerances, the process comprising expanding the tube terminal portions successively by a rolling action, visibly indicating the rolling torque during the rolling operation, continuing the rolling action until the indicated torque reaches a predetermined optimum value for the tube wall sizes and materials involved, and terminating the rolling action when said predetermined optimum value of torque is indicated.

PHILIP J. WELCH.